US008326051B1

(12) United States Patent
Hobbs

(10) Patent No.: US 8,326,051 B1
(45) Date of Patent: Dec. 4, 2012

(54) METHOD AND APPARATUS FOR PROGRESSIVE ENCODING FOR TEXT TRANSMISSION

(75) Inventor: David Victor Hobbs, Surrey (CA)

(73) Assignee: Teradici Corporation, British Columbia (CA)

( * ) Notice: Subject to any disclaimer, the term of this patent is extended or adjusted under 35 U.S.C. 154(b) by 887 days.

(21) Appl. No.: 12/378,942

(22) Filed: Feb. 20, 2009

Related U.S. Application Data

(60) Provisional application No. 61/030,811, filed on Feb. 22, 2008.

(51) Int. Cl.
*G06K 9/36* (2006.01)

(52) U.S. Cl. ...................................... 382/232

(58) Field of Classification Search .................. 382/100, 382/112, 162, 164–166, 173, 175–181, 209, 382/229, 232–233, 254, 284, 291–292; 358/537–540, 426.04, 448–453, 462, 464
See application file for complete search history.

(56) References Cited

U.S. PATENT DOCUMENTS

| | | | | |
|---|---|---|---|---|
| 5,778,092 | A * | 7/1998 | MacLeod et al. | 382/176 |
| 6,992,686 | B2 * | 1/2006 | Nagarajan | 345/660 |
| 7,190,837 | B2 * | 3/2007 | Li et al. | 382/232 |
| 7,302,097 | B2 * | 11/2007 | Bai et al. | 382/173 |
| 7,782,339 | B1 * | 8/2010 | Hobbs et al. | 345/626 |
| 7,783,117 | B2 * | 8/2010 | Liu et al. | 382/232 |
| 8,014,596 | B2 * | 9/2011 | Campbell et al. | 382/164 |
| 8,041,139 | B2 * | 10/2011 | Ma | 382/254 |
| 2004/0017939 | A1 | 1/2004 | Mehrotra | |
| 2005/0036694 | A1 | 2/2005 | Li et al. | |

OTHER PUBLICATIONS

Barthel, Kai Uwe et al., "New Technology for Raster Document Image Compression," Proc. SPIE, vol. 3967 (1999), pp. 286-290; Publication Date: Jan. 26, 2000; Location: San Jose, CA, USA DOI:10.1117/12.373504.

Mukherjee, Debargha et al., "JPEG2000-Matched MRC Compression of Compound Documents," IEEE International Conference on Image Processing 2002, Proceedings, vol. 3, pp. III-73-III-76, vol. 3, Meeting Date: Sep. 22-25, 2002, Location: Rochester, New York, USA.

Roterman, Yalon and Porat, Moshe, "Progressive Image Coding Using Regional Color Correlation," EC-VIP-MC 2003, 4th EURASIP Conference on Video/Image Processing and Multimedia Communications, pp. 65-70, Meeting Date Jul. 2-5, 2003, Location: Zagreb, Croatia.

Misic, Vladimir and Parker, Kevin J., "MRC for Compression of Colored Engravings," EUSIPCO'2002—11th European Signal Processing Conference, vol. II, pp. 129-132, Date: Sep. 2002, Location: Toulouse, France.

(Continued)

*Primary Examiner* — Jose Couso
(74) *Attorney, Agent, or Firm* — Moser Taboada

(57) ABSTRACT

A method and apparatus for transmitting image information for display within a remote computing environment. The apparatus comprises a decomposition filter for determining a text mask from an image, the text mask determined from a text layer and related text-background information extracted from the image and comprising an initial mask and at least one refinement mask, a text mask encoder for encoding a refinement mask of the at least one refinement masks to generate a refinement encoding, and a network interface for transmitting at least one encoding, the at least one encoding comprising the refinement encoding.

37 Claims, 13 Drawing Sheets

OTHER PUBLICATIONS

Chamzas, Christos and Duttweiler, D. L., "Progressive Encoding of Facsimile Images using Edge Decomposition (PED)," Global Telecommunications Conference, 1988. IEEE GLOBECOM '88, pp. 1011-1015, vol. 2, Publication Date: Nov. 28-Dec. 1, 1988, Meeting Date: Nov. 28-Dec. 1, 1988, Location: Hollywood, FL, USA.

Haffner, Patrick et al., "Browsing through High Quality Document Images with DjVu," Fifth International Forum on Research and Technology Advances in Digital Libraries (ADL '98), 1998, pp. 309-318; Publication Date: Apr. 22-24, 1998, Meeting Date: Apr. 22-24, 1998; Location: Santa Barbara, CA, USA.

JPEG 2000 Image Coding System, JPEG 2000 Final Committee Draft Version 1.0, Mar. 16, 2000.

"Mixed Raster Content (MRC)," ITU-T Recommendation T.44, International Telecommunication Union, Jan. 2005.

U.S. Appl. No. 11/173,303, filed Jun. 30, 2005.

US Non-Final Office Action mailed Apr. 15, 2009 for U.S. Appl. No. 11/173,817, filed Jun. 30, 2005.

* cited by examiner

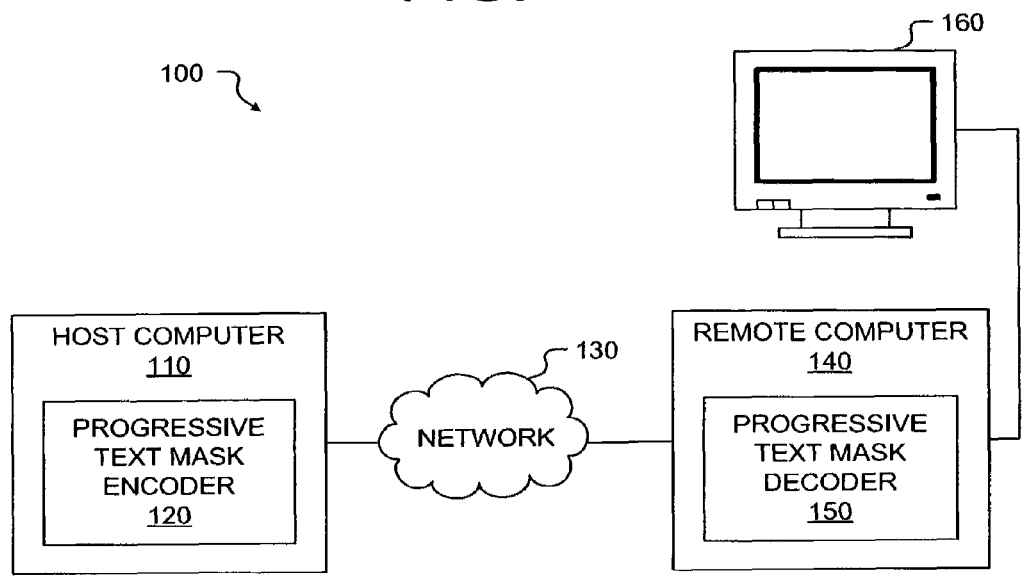
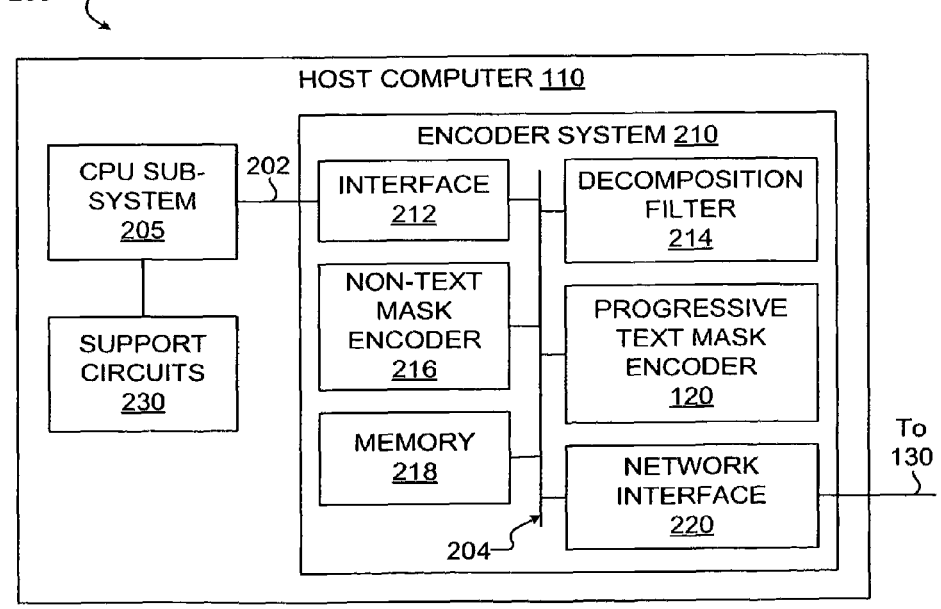

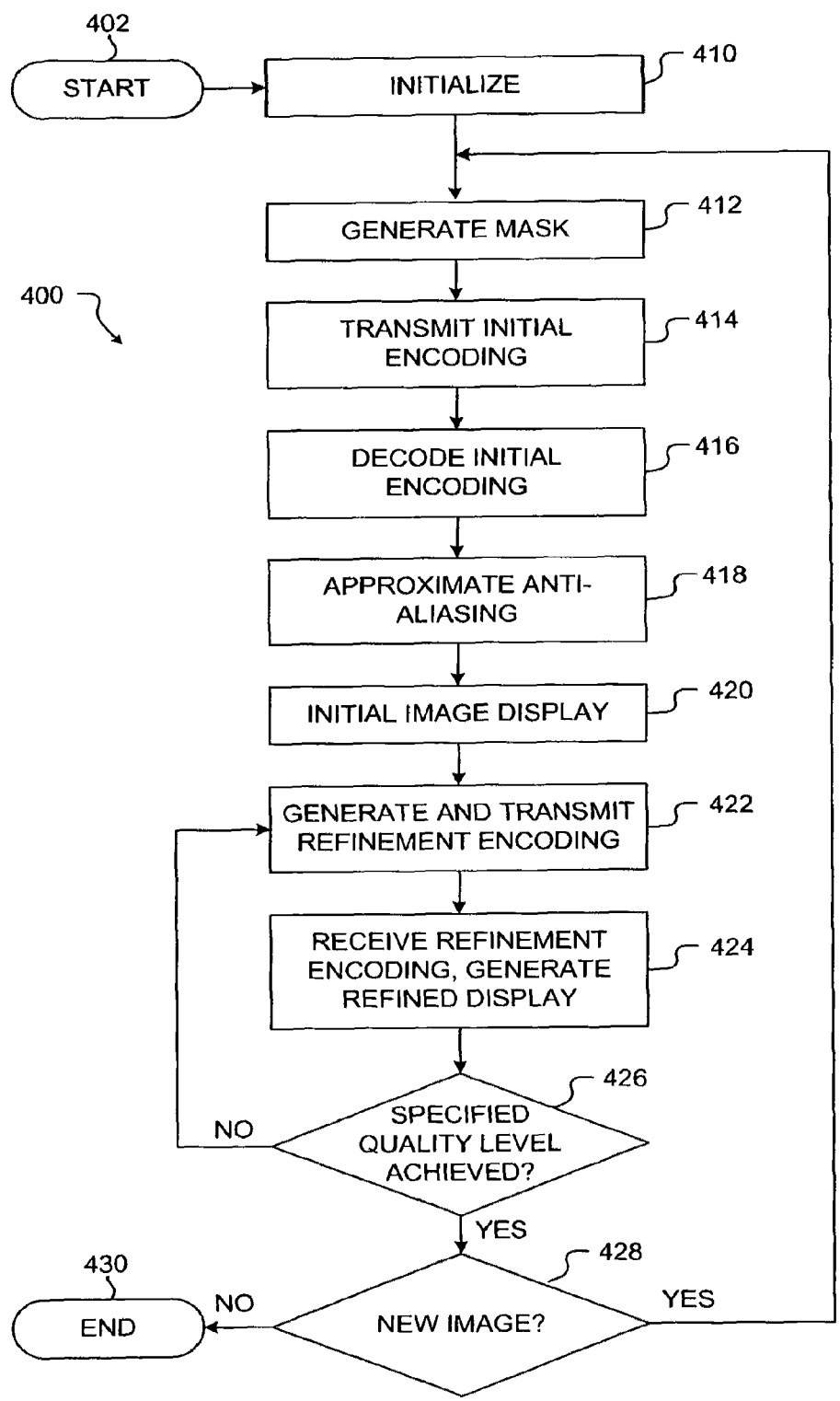

FIG. 5a
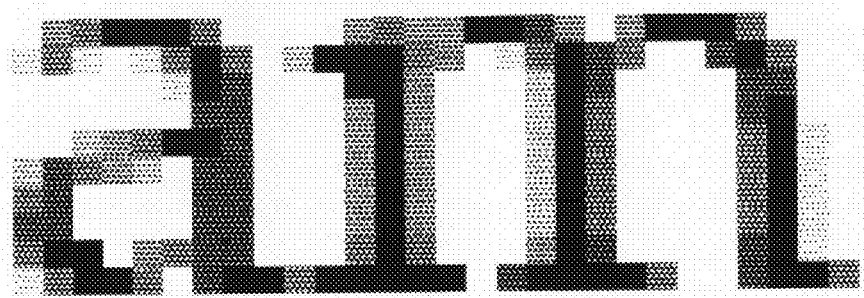
FIG. 5b
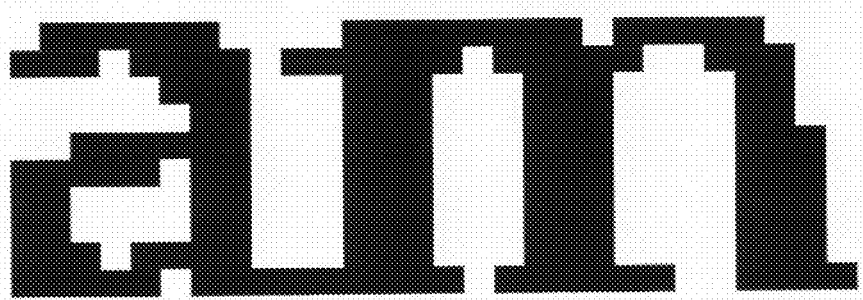
FIG. 5

FIG. 5c
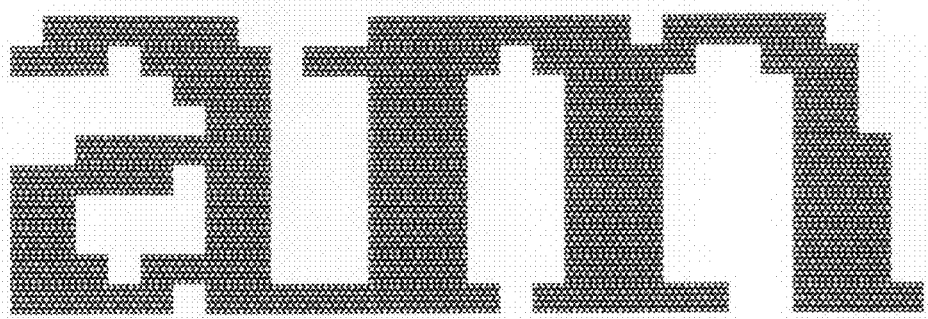
FIG. 5d
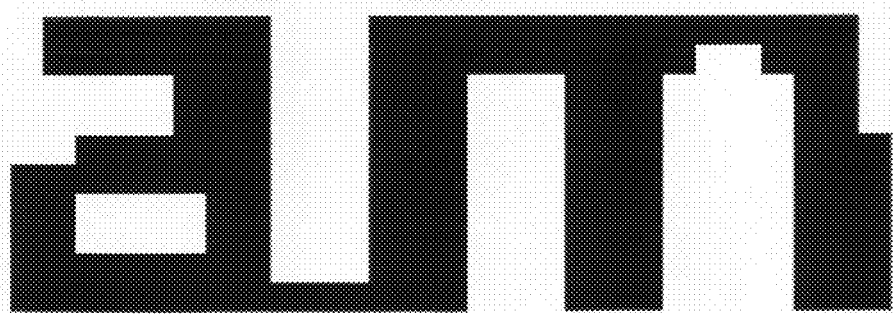
FIG. 5

FIG. 5e
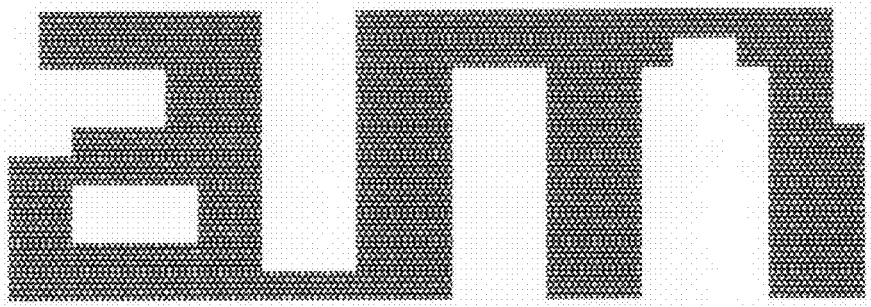
FIG. 5f
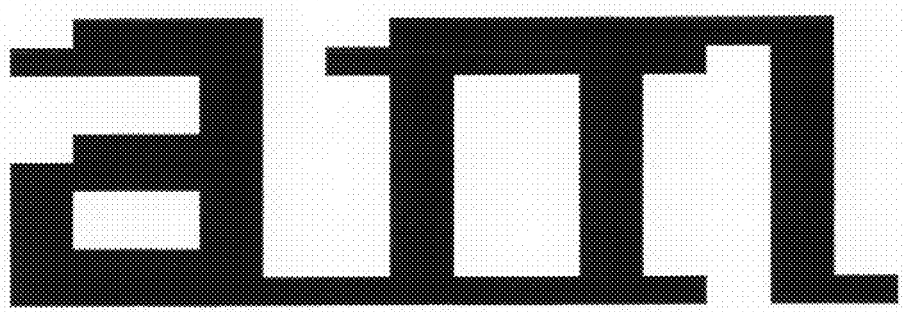
FIG. 5

FIG. 6c
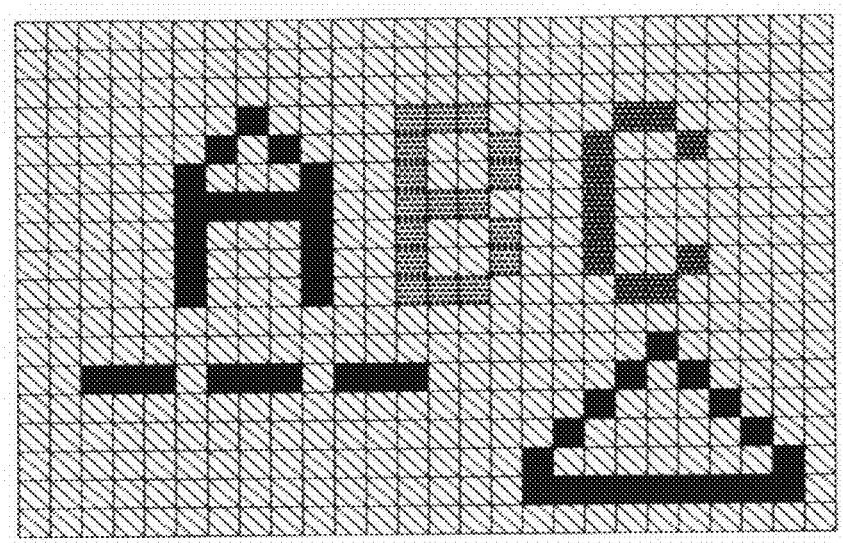
FIG. 6d
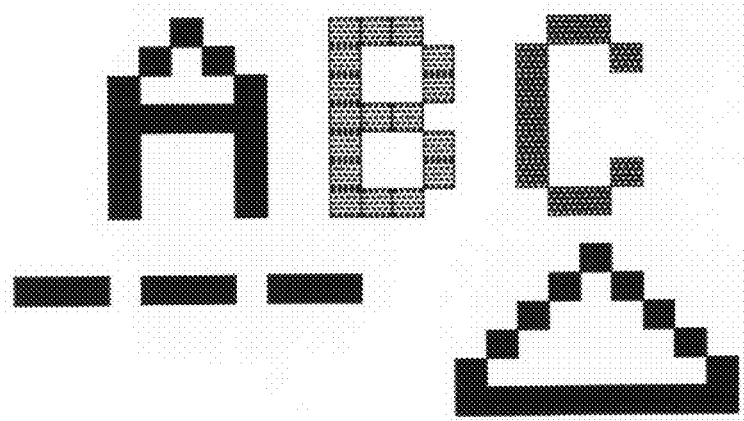
FIG. 6

FIG. 6e
FIG. 6f
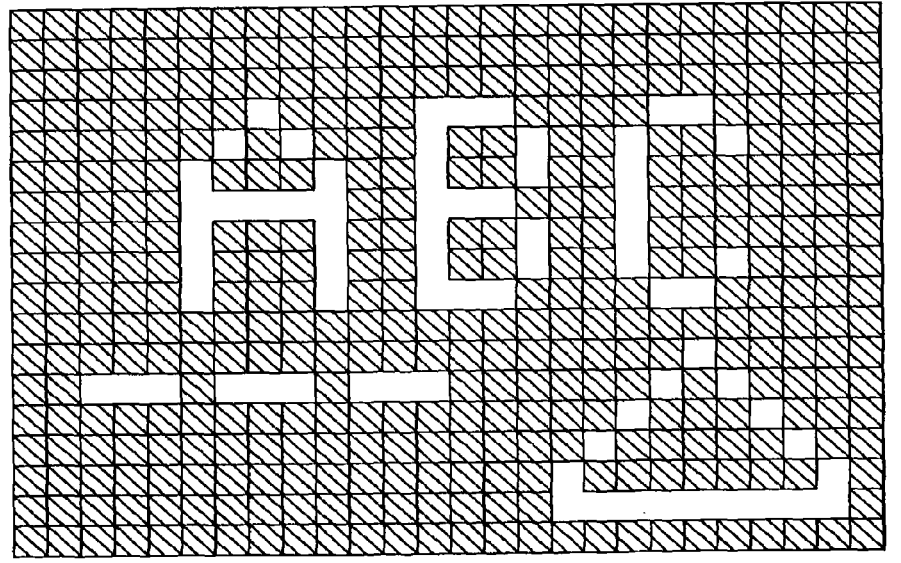
FIG. 6

FIG. 6g
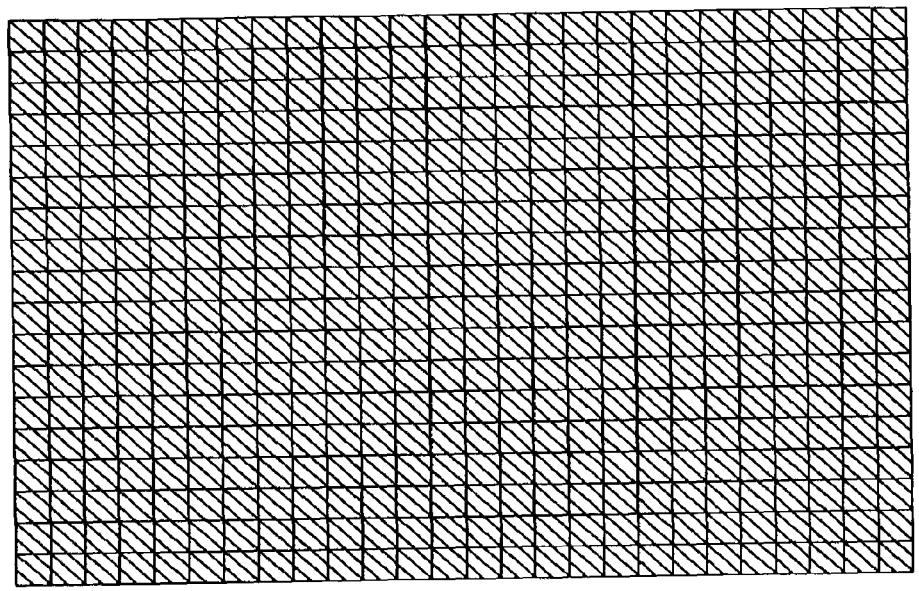
FIG. 6h
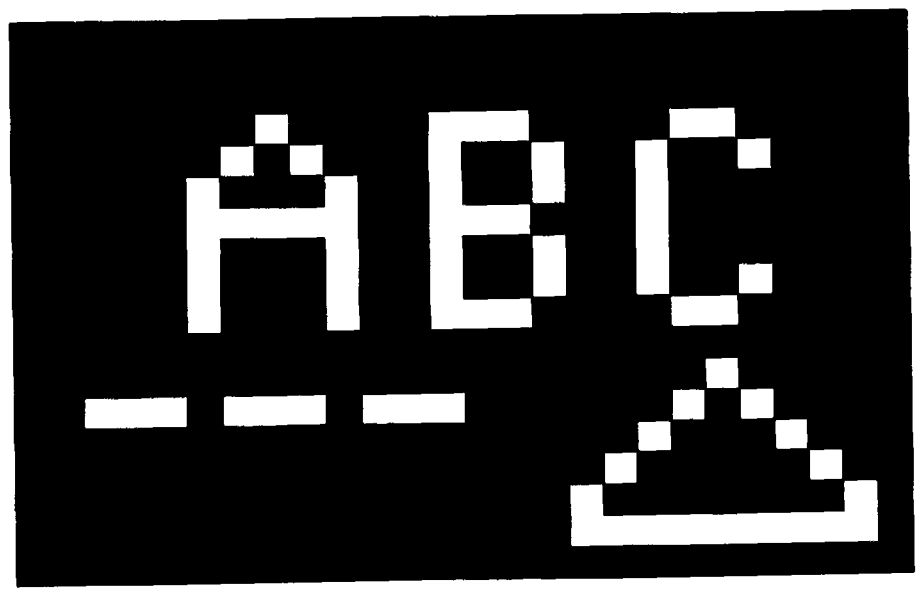
FIG. 6

METHOD AND APPARATUS FOR PROGRESSIVE ENCODING FOR TEXT TRANSMISSION

CROSS-REFERENCE TO RELATED APPLICATIONS

This application claims benefit of U.S. Provisional Patent Application 61/030,811 entitled "Progressive Text Transmission Methods", filed Feb. 22, 2008, which is herein incorporated by reference.

BACKGROUND OF THE INVENTION

1. Field of the Invention

Embodiments of the present invention relate generally to a system and method for transmitting images comprising text information from one computing system to another within a remote computing environment.

2. Description of the Related Art

Transmission of high resolution images to a remote system over a constrained channel has various challenges. In order to address some of these challenges, images are typically compressed at the source to reduce the size of the data set prior to transmission. Even then, there can be a noticeable delay between when the original image is transmitted and when the received image is available for display. This is particularly problematic if the system has real time interactive requirements such as the case of a remote graphical user interface (GUI).

One method of decreasing the latency (i.e., increasing the responsiveness) is to prioritize the data transmission, for example by using progressive image transmission (PIT) methods such as those available in the Graphics Interchange Format (GIF) and Joint Photographic Experts Group (JPEG) 2000 coding standards. However, some images such as computer displays are not ideally suited to such homogenous lossy compression methods. While background and picture regions of these types of images may be compressed using lossy techniques such as JPEG, these techniques are unacceptable for text regions where it is important to preserve detail associated with the text character information. One way to overcome this limitation involves decomposing the image into text and other regions prior to compression, and then processing the text regions separately, for example by applying lossless encoding methods. However, in this case, text regions do not benefit from PIT methods and remain subject to the latency constraints of the transmission channel.

Therefore, there is a need in the art for a method and system for efficiently transmitting image text to a remote system within a remote computing environment.

SUMMARY OF THE INVENTION

Embodiments of the present invention generally relate to a method and apparatus for transmitting image information for display within a remote computing environment. The apparatus comprises a decomposition filter for determining a text mask from an image, the text mask determined from a text layer and related text-background information extracted from the image and comprising an initial mask and at least one refinement mask, a text mask encoder for encoding a refinement mask of the text mask to generate a refinement encoding, and a network interface for transmitting at least one encoding, the at least one encoding comprising the refinement encoding.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a block diagram of a system for transmitting text images in accordance with one or more embodiments of the present invention;

FIG. 2 is a block diagram of a host computer in accordance with one or more embodiments of the present invention;

FIG. 4 is a flow diagram of a method for transmitting progressively encoded text in accordance with one or more embodiments of the present invention;

DETAILED DESCRIPTION

Figure 3:
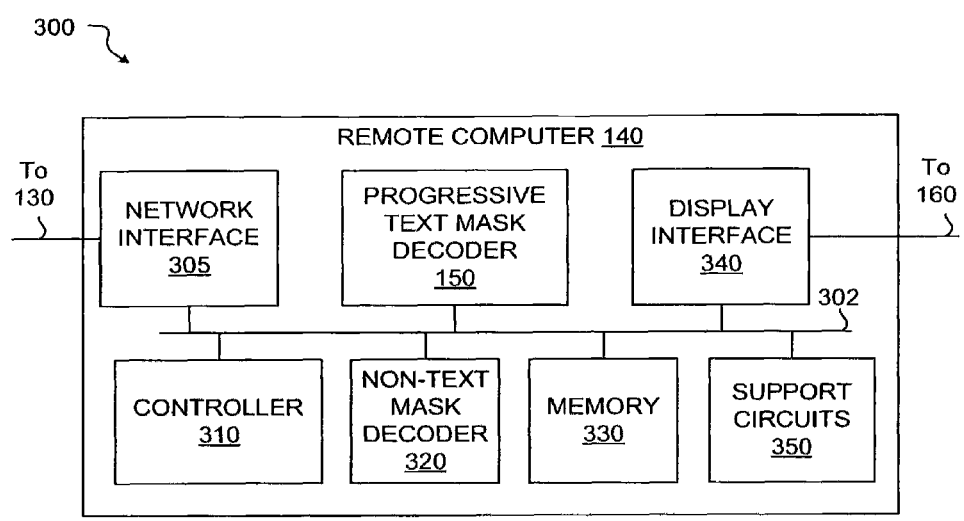
FIG. 3 is a block diagram of a remote computer in accordance with one or more embodiments of the present invention.

The term processor as used herein refers to any type of processor, CPU, microprocessor, microcontroller, embedded processor, media processor, graphics processor, or any other programmable device capable of executing and/or interpreting instructions in a form of software (such as microcode, firmware and/or programs).

The term software as used herein refers to any type of computer-executable instructions for any type of processor, such as programs, applications, scripts, drivers, operating systems, firmware, and microcode. Computer-executable instructions include any types of instructions performed by a processor, such as binary instructions that are directly performed, instructions that are translated and/or decoded prior to being performed, and instructions that are interpreted. The processor may be a component of a general purpose computer that, when executing the instructions, becomes a specific purpose computer that performs various embodiments of the invention.

The drawings include drafting symbol patterns and shading for representing color. The colors of the invention are not limited to those specifically indicated in the drawings.

One or more embodiments of the present invention comprise a method and system for transmitting text information to a remote system for display. As described in detail below, a host computer encodes and transmits an initial mask of a text mask ("initial encoding") to a remote computer, and subsequently encodes and transmits one or more refinement masks of the text mask ("refinement encodings") to the remote computer. The remote computer progressively decodes the encodings to generate an output display. Such progressive encoding/decoding techniques enable presentation on a display device of a less accurate version of a text region pertaining to the text mask prior to complete information for the text mask being received. Accordingly, the display system is quickly responsive to changes in text and/or image content, even under resource constraints (e.g., network bandwidth limitations). Additionally, high-detail aspects of an image or areas outside a region of interest of the image can be delayed based on host computer resource or transmission bandwidth availability.

FIG. 1 is a block diagram of a system 100 for transmitting text images in accordance with one or more embodiments of the present invention. Host computer 110 is coupled to remote computer 140 by network 130. Additionally, the remote computer 140 is coupled to a display 160. FIG. 1 portrays only one variation of the myriad of possible network configurations. For example, system 100 may comprise numerous host computers 110 and/or several remote computers 140. For simplicity and clarity, only one host computer 110 and only one remote computer 140 are depicted and described. Network 130 comprises a communication system (e.g., the Internet, LAN, WAN, or the like) that connects computer systems completely by wire, cable, fiber optic, and/or wireless links facilitated by various types of well-known network elements, such as hubs, switches, routers, and the like. The network 130 may employ various well-known protocols to communicate information amongst the network resources.

Host computer 110 comprises progressive text mask encoder 120 and is, generally, a computer or system of computers designated for running user software applications and generating graphics information in the form of pixel data, graphics commands, video information, or the like. For example, in one or more embodiments, host computer 110 executes application software, encodes images associated with the application software using progressive text mask encoder 120 to progressively encode text regions of the image representations (i.e., to generate a rudimentary encoding of a text mask followed by one or more refinement encodings of the text mask), and transmits the progressively encoded image information to remote computer 140.

In one or more embodiments of the present invention, one or more images comprising text information ("text images") are created and/or stored on host computer 110. According to various embodiments, the one or more text images are one or more of: a series of still images comprising text information, such as photographic images with embedded or overlaid text; synthetic images; one or more frames of a stream of images, such as a video stream or a movie with a text overlay such as subtitle information; video or composite images, such as a stream of computer display images optionally and/or selectively including photographs and/or video and/or text overlay; scrolling images, such as in a graphical word processing environment; other changing display information; a portion of a larger image, such as a bounded region of the larger image; a region and/or a layer of any of the foregoing; and any combination of the foregoing.

The host computer 110 decomposes a text image into one or more layers based on one or more spatial and/or temporal features, such as region (location in the particular image), contrast, color, content, and other suitable parameters. Such layers may include text layers and corresponding text-background layers, i.e., information pertaining to background pixels of a text region in which the text resides ("text-background"), as well as one or more other layers ("non-text layers") describing other image types. In various embodiments, a decomposition method is used to identify text layers, text-background layers, object layers and monotonic background-fill (i.e., background not associated with the text) layers. Areas of the image comprising content such as natural images, gradient-fill, patterns or textures are accumulated on a picture layer by a process of exclusion. In some embodiments, a video layer is identified by monitoring drawing commands. Additionally and/or alternatively, the text image may be decomposed into one or more image portions, such as regions, of different image types. In some embodiments, an image is decomposed into different layers based on a pixel update status, and the image is progressively encoded such that transmission is prioritized in relation to when the source display information changed. In further embodiments, a pixel associated with text or image content that has been processed, for example encoded and transmitted, is covered by a mask until it changes value to prevent retransmission of redundant information.

Each layer of a particular type (text, picture, and the like) consists of a group of pixels of that particular type identifying the positioning and colors of those pixels. Each text layer and the related text-background layer may be described by one or more text masks, each text mask determined from (i.e., comprises) at least a portion of a text layer as well as the related text-background layer information. Additionally, each text mask comprises (i.e., may be decomposed to determine) at least one binary mask ("text pixel mask") indicating areas of a corresponding text region that are represented by text information. In some embodiments, other layers are also described by one or more image-type masks indicating specific image types (e.g., picture masks, object masks, background-fill masks, and the like).

Progressive text mask encoder 120 progressively encodes text masks determined from the text image using progressive encoding techniques suitable for text. In some embodiments, a rudimentary encoding of a text mask (i.e., an encoding of an initial mask of the text mask) is generated, followed by one or more refinement encodings of the text mask (i.e., encodings of one or more refinement masks of the text mask), for example by adding color information and/or anti-aliasing information. Such encoding and/or transmitting may be prioritized, for example by a pixel update status and/or an available bandwidth, such as an available communication bandwidth of a network interface performing the transmitting or resource bandwidth associated with the host computer such as memory bandwidth or encoding resource availability. In some embodiments, progressive text mask encoder 120 may be enabled to efficiently encode fine bit patterns of the text pixel mask as well as pixel color values and pixel color value variations of computer generated text.

Such progressive encoding techniques differ from progressive encoding techniques used for pictures; for example, progressively encoding text emphasizes the shape of the text pixel mask and de-emphasizes the coloring. In one embodiment, the binary text pixel mask (i.e., an initial mask) may be encoded as an initial encoding with an arithmetic or run-length encoder, where the only color encoded is a single text-background color. The text mask decoder 150 will then select a contrasting color to the text-background color for display of the text region. Additionally, progressive text mask encoder 120 may indicate one or more text attributes, such as identifying the text mask as anti-aliased text, and the decoder may color the text pixels based on the text-background color, the positioning of each text pixel in the text pixel mask, and the indicated text attributes.

Generally, the text-background consists of a solid color, and as part of encoding the text mask, the extent of the text-background around the text may be determined, for example by determining simple pixel distance from the text or by defining a text-background mask. In some embodiments, a method of decomposition to identify text specifically detects a solid text-background color to distinguish text from other small high contrast image elements within a picture. Such small, high contrast image elements on the solid text-background are then identified as a text layer.

The host computer 110 may additionally encode one or more masks pertaining to other layers, such as the picture layer, as further described below.

Remote computer 140 is, generally, any form of computing device that can generate image data for display and connect to network 130. For example, in an embodiment remote computer 140 is a terminal in a networked computer system (e.g., in an embodiment, system 100 is a remote computing system). Such remote terminals include thin clients, personal computers, workstations, Personal Digital Assistants (PDAs), wireless devices, and the like.

Remote computer 140 comprises progressive text mask decoder 150 that decodes encoded text information, such as a rudimentary encoding of a text mask and refinement encodings, for example using an inverse equivalent of the encoding method applied to the text mask at the host computer 110; in other embodiments, remote computer 140 generates an estimate of the text region based on information decoded from the encoded text mask, where the encoded text mask comprises an approximation of one or more text layers. In some embodiments, text mask decoder 150 follows a progressive decoding corresponding to the progressive encoding by using the rudimentary encoded mask to generate rudimentary text images, followed by image refinements such as addition of color (text pixel and/or text-background), pixel mask refinements, and/or text attribute detail (e.g., anti-aliasing, luminance profile, and the like). Additionally, remote computer 140 may decode encoded other masks (e.g., encoded picture masks) using one or more decoding methods that perform the inverse of the host encoding. Remote computer 140 constructs an output display image from the various decoded layers for presentation on display 160.

In some embodiments, remote computer 140 also comprises peripheral devices such as mouse, keyboard, and/or other well known peripherals, and presents a remote Graphical User Interface (GUI) on display 160. Display 160 is any screen type device (e.g., liquid crystal display (LCD), cathode ray tube (CRT), plasma display, and the like) that displays images.

By transmitting the text image in the manner previously described, the remote computer 140 is enabled to display a low latency, lower-quality (less accurate) version of a text region of the text image after decoding the initial rudimentary text mask, and refine (increase the accuracy of) the displayed image using subsequent progressively encoded updates (i.e., refinement encodings) until a specified level of quality of the displayed text region is achieved.

FIG. 2 is a block diagram of a host computer 110 in accordance with one or more embodiments of the present invention. The host computer 110 is enabled to perform progressive text encoding and optionally additional non-text image encoding such as one or more of Discrete Cosine Transform (DCT) encoding, wavelet encoding, and/or other progressive and non-progressive image encoding techniques.

Host computer 110 includes a central processing unit (CPU) sub-system 205, encoder system 210, and support circuits 230. CPU sub-system 205 is communicatively coupled to encoder system 210 by bus 202 such as one or more of: a Digital Visual Interface (DVI) bus; a DISPLAYPORT bus; a Peripheral Component Interconnect (PCI) bus; a PCI-Express bus; a HYPERTRANSPORT bus; an Advanced Microprocessor Bus Architecture (AMBA) bus; and any other connections, including wired, wireless, and optical connections, for coupling CPU sub-system 205 and encoder system 210. In some embodiments, bus 202 includes communications elements, such as controllers, data buffers and/or registers, drivers, repeaters, and receivers. In various embodiments, bus 202 includes address, control, and data connections to enable communications among components of host computer 110.

In some embodiments, the bus 202 coupling CPU sub-system 205 to encoder system 210 additionally communicatively couples other components of host computer 110.

According to various embodiments, CPU sub-system 205 comprises one or more CPUs connected to memory and Graphics Processing Unit (GPU) by a chipset and well known local bus structure, such as one or more PCI or PCI-Express buses, HYPERTRANSPORT interconnects, memory buses, Accelerated Graphics Port (AGP), and the like. Examples of a well known suitable CPU include 32-bit, 64-bit, or other CPU such as OPTERON or ATHLON class microprocessors manufactured by AMD Corporation, XEON, PERYN, PENTIUM or X86 class processors manufactured by Intel, SPARC microprocessors manufactured by Sun Microsystems Inc. or microprocessor such as a POWERPC processor manufactured by Motorola. However, any other suitable microprocessor platform may be utilized. Memory associated with CPU sub-system 205 comprises any one or combination of volatile computer readable media (e.g., random access memory (RAM), such as DRAM, SRAM, etc.) and nonvolatile computer readable media (e.g., ROM, hard drive, tape, CDROM, DVDROM, magneto-optical disks, EPROM, EEPROM, Flash EPROM etc.). Moreover, system memory may incorporate electronic, magnetic, optical, and/or other types of storage media. The memory of CPU sub-system 205 stores host software such as application software related to a text image source, operating system, drivers and the like.

According to various alternative embodiments, CPU sub-system 205 comprises or is replaced by an alternative image source such as one or more of: a processor capable of generating and/or manipulating images; an interface for receiving compressed and/or uncompressed image data such as a mass storage interface, a camera interface, a network interface, a peripheral interface, or other image-receiving interface; any other source of digital images; and any electronics, including any programmable electronics such as a processor, for converting, processing, selecting, and/or combining any of the foregoing.

Encoder system 210 performs image encoding operations, such as one or more of image type decomposition, progressive text encoding (i.e., generating a rudimentary encoding of a text mask followed by one or more refinement encodings of the text mask), transforming, progressive quantization, and binary encoding. In some embodiments, encoder system 210 is implemented, at least in part, as a set of computer-executable instructions. According to various embodiments, to implement encoders 216 and 120, encoder system 210 includes one or more of: a programmable embedded digital media processor, such as a TMS320DM64x DAVINCI digital media processor available from Texas Instruments; a PNX1300 NEXPERIA processor from NXP Semiconductors; a Field Programmable Gate Array (FPGA) or an Application Specific Integrated Circuit (ASIC) configured, at least in part, as a logic circuit to perform image encoding; other processors and/or electronic hardware suitable for performing image encoding; and any combination of the foregoing.

Generally, encoder system 210 is an image encoder that uses one or more encoding techniques, such as progressive encoding, to encode an image stream, such as a stream of pixels from CPU sub-system 205. According to various embodiments, system 210 connects to a display output (such as a Digital Video Interface, or DVI, output) of CPU subsystem 205 by interface 212. System 210 comprises one or more processing elements, such as decomposition filter 214, progressive text mask encoder 120, and non-text mask encoder 216, communicatively coupled, for example using a local bus structure 204, and enabled to execute progressive text encoding methods as described herein for encoding text regions of the display image. Interface 212 captures image data such as conveyed by a pixel stream and stores image frames or partial frames in encoder memory 218.

In other embodiments, encoder system 210 is an image encoder that uses one or more encoding techniques, such as progressive encoding, to encode image frames, such as one or more frame buffers associated with CPU sub-system 205. In some such embodiments, some elements of encoder system 210 are integrated with CPU sub-system 205 or implemented, at least in part, as one or more software programs stored in memory that is executed by sub-system 205.

In some embodiments, decomposition filter 214 is a processing resource that determines one or more image-type masks (i.e., text masks, picture masks, and the like) from an image. In order to determine the various image-type masks, the decomposition filter 214 decomposes image frames, sub-frames (e.g., blocks), or other defined image regions (e.g., a text region, a picture region, and the like) into layers of different image types, such as background-fill, text, text-background, picture, video, object, and the like, based on spatial and temporal features, such as contrast, color content, or other suitable parameters. Additionally, one or more layers may be further decomposed, for example a text layer may be further decomposed to generate a text pixel mask. In order to perform such decomposition, the decomposition filter 214 may comprise at least one of an image contrast analyzer, a color counter, a text recognition analyzer, a background recognition analyzer, or a drawing commands analyzer. The various image-type masks, may then be determined; for example, a text mask may be determined from a text layer and a related text-background layer.

According to some embodiments, encoder system 210 may comprise a change detector (not shown) to determine a pixel update status that indicates whether any changes have occurred in the image and/or one or more regions of the image or if the image and/or regions of the image have remained consistent. Additionally, the pixel update status may indicate information related to changes in an image and/or a region of the image, such as elapsed time since a pixel has changed. Images may be decomposed into different layers based on whether the pixel update status indicates that a pixel or area has been communicated and/or elapsed time since a pixel has changed. In some such embodiments, a pixel that has been processed, for example, encoded and transmitted, is covered by a mask until it changes value to prevent processing and transmission of redundant information. In some embodiments, a new text mask may be determined when the pixel update status indicates that a change has occurred; alternatively, a text mask may be re-determined even when the pixel update status indicates no changes have occurred. In some embodiments, encoding of masks pertaining to different regions of an image may be prioritized based on their respective change statuses determined from the pixel update status.

The decomposition filter 214 may determine a multi-layer mask using text detection methods such as image contrast analysis, for example as disclosed in commonly assigned U.S. patent application Ser. No. 11/173,303, entitled "Methods for Generating Masks for a Multi-Layer Image Decomposition" and filed Jun. 30, 2005, which is herein incorporated in its entirety by reference; text recognition methods known to the art; or analysis of drawing commands executed by CPU sub-system 205, such drawing commands providing attributes that enable image areas to be classified as video, picture, text, background-fill, icons, photographs, or other elements typical of a graphic user interface, where such drawing commands may be contained within the corresponding text layer. In some such embodiments, each layer of the multi-layer mask is a binary map corresponding to the underlying input image, wherein areas of the input image not associated with the layer type are reflected as zero values in the mask. In some embodiments, filter 214 stores the multi-layer mask in encoder memory 218.

According to some embodiments, decomposition filter 214 further identifies text attributes associated with one or more text layers and provides identification information, for example in an information field associated with a text layer. Such identification information may identify one or more of a luminance profile, a chrominance profile, block text (i.e., aliased text), bold text, anti-aliased text, TRUETYPE® text, FREETYPE® text, or Microsoft's CLEARTYPE® text (i.e., sub-pixel anti-aliased text) type. In some embodiments, anti-aliasing text attributes are determined by analyzing contrast levels of text features. For example, block text is typically characterized by a sharp transition between text and text-background pixels while anti-aliased text is usually characterized by a transition comprising pixels of intermediate shading. In some embodiments, CLEARTYPE® text attributes are determined by comparing the alignment of text features across different color planes and identifying offsets in alignment. While block text is characterized by the same alignment across all color planes, CLEARTYPE® text is characterized by red on the leading vertical edge of text features and blue on the trailing vertical edges of the features in the case of text associated with RGB display system. In the case of BGR display systems, red and blue are switched.

According to various embodiments, progressive text mask encoder 120 is a processing resource that encodes a text mask using progressive text encoding, for example as previously described. In some embodiments, such progressive encoding comprises a rudimentary encoding of an initial mask of the text mask, such as a lossy sub-sampling or filtering of the text mask in combination with a lossless encoding method such as Golomb coding, Rice coding, Huffman coding, or the like, followed by refinement encodings of one or more refinement masks of the text mask, such as a lossless encoding of the full resolution mask. In other embodiments, anti-aliased or CLEARTYPE® text is encoded as a homogenous block text approximation described by a surrounding mask in a first pass to generate the initial encoding, followed by a lossless encoded refinement update comprising anti-aliased or CLEARTYPE® pixel details in one or more subsequent passes to generate one or more refinement encodings. In other embodiments, a first pass approximation comprises averaged chrominance and luminance information for a text area and one or more progressive updates comprise additional color detail information associated with the text area. In some embodiments, a text mask or text layer of a multi-layer mask is retrieved from encoder memory 218, encoded and queued for transmission across network interface 220. In some embodiments, the transmission may be prioritized based on a pixel update status and/or an available bandwidth, such as an available communication bandwidth of network interface 220.

In some embodiments, progressive text mask encoder 120 maintains a text mask status for identifying associated pixels of the text mask and a current build state. For each update (frame), progressive text mask encoder 120 checks whether the pixels remain unchanged, for example by performing a comparison to a previous record (such as a cyclic redundancy check—CRC-value). If the pixels are unchanged, progressive text mask encoder 120 determines the previous encoding/transmission step from the status. For example, a five-step to lossless encoder records the encoded step as part of the text mask status after each encoding.

According to various embodiments, non-text mask encoder 216 is a processing resource that performs image encoding, such as progressive image encoding, of one or more non-text layers of a decomposed image, for example image regions and associated content as specified by a decomposition mask (e.g., a picture mask, a background-fill mask, and the like). Analogous to the progressive text encoding, the progressive image encoding comprises an encoding of an initial mask of an image-type mask, such as a picture mask, followed by one or more encodings of one or more refinement masks of the image-type mask. In some such embodiments, encoding functions executed by non-text mask encoder 216 include lossy or lossless compression using wavelet or DCT transform and quantization and entropy encoding (such as Huffman encoding, Golomb coding, variable length coding (VLC), context-adaptive VLC or context-adaptive binary arithmetic coding (CABAC)) of image frames or regions stored in memory 218. In some embodiments, non-text mask encoder 216 comprises still image or video encoding resources such as a JPEG encoder, an MPEG encoder, or the like. Non-text mask encoder 216 may be enabled to efficiently encode color values and color value variations of blocks of natural images, and to efficiently encode picture pixel masks comprising blocks of picture pixels.

In some embodiments, non-text mask encoder 216 emphasizes the luminance first, chrominance second, and pixel mask shape third in the progressive encoding of a picture mask determined from a picture layer. In some embodiments, a picture pixel mask (i.e., a binary mask indicating pixels corresponding to the picture layer) may be blocked as 16×16 pixel blocks to facilitate easier transformation-based encoding, such as Discrete Cosine Transform (DCT) or Discrete Wavelet Transform (DWT). The picture mask is then progressively encoded using previously described progressive encoding techniques for pictures. Additionally, the picture mask may contain a low contrast image portion and/or a low contrast image portion comprising at least one high contrast image portion within the low contrast image portion.

According to various embodiments, encoder memory 218 stores image and mask information such as information related to intermediate encoding steps. In some embodiments, at least part of encoder memory 218 is distributed, for example encoders 120 and 216 each have a dedicated memory in some embodiments. In other various embodiments, encoder system 210 shares memory resources associated CPU sub-system 205. For example, in some embodiments system memory and/or drawing memory share memory resources with encoder memory 218. In various embodiments, encoder memory 218 includes Dynamic Random Access Memory (DRAM), such as synchronous DRAM or video DRAM.

According to various embodiments, network interface 220 provides a communication interface for communicating encoded image data with a remote computer (such as remote computer 140) using communications infrastructure (such as network 130). Network interface 220 sends and receives electrical, electromagnetic, and/or optical signals that carry data, such as digital data streams, representing various types of information. In some embodiments, network interface 220 supports protocol stacks for network communications, such as TCP/IP and/or encryption protocols.

In various embodiments, resources of image encoder 210 such as interface 212, decomposition filter 214, encoders 120 and 216, memory 218, and network interface 220 are coupled by bus 204. Bus 204 may additionally provide communicative coupling to other components of host computer 110. According to various embodiments, bus 204 is one or more of: a PCI bus; a PCI-EXPRESS bus; a HYPERTRANSPORT bus; an AMBA bus; and any other connections, including wired, wireless, and optical connections, for coupling image encoder resources. In some embodiments, bus 204 includes communications elements, such as controllers, data buffers and/or registers, drivers, repeaters, receivers, in addition to address, control, and data connections to enable communications among components. According to various embodiments, bus 204 is one or more of: independent of bus 202; a same bus as bus 202; a part of bus 202; bridged to bus 202; and communicatively coupled to bus 202.

Support circuits 230 may include cache, power supplies, local buses, interconnect chips, clock circuits, data registers, I/O interfaces, storage elements, local peripheral device interfaces and the like. Further, interconnects may include address, control, interrupt and/or data connections, controllers, data buffers, drivers, repeaters, and receivers to enable appropriate communications among CPU sub-system 205 and encoder system 210.

FIG. 3 is a block diagram of a remote computer 140 in accordance with one or more embodiments of the present invention. The remote computer 140 is enabled to receive an encoded image comprising text, and enabled to display a decoded version of the image. As illustrated in FIG. 3, one or more embodiments of remote computer 140 include network interface 305, controller 310, progressive text mask decoder 150, non-text mask decoder 320, memory 330, display interface 340, and support circuit 350 communicatively coupled by bus 302. In some embodiments, remote computer 140 is implemented, at least in part, as a processor, a computer system, and/or a programming or a processing environment configured to receive and to decode a progressively encoded image stream. According to various embodiments, remote computer 140 includes one or more of: Human Interface Devices (HIDs); peripheral components, such as microphones or speakers; other interfaces, such as a USB interface; and other components, interfaces, and/or connections associated with computer systems, desktop computers, and/or processors.

In some embodiments, remote computer 140 is implemented as a stand-alone system, such as a thin client or a desktop computer. In some embodiments, such as some stand-alone embodiments, remote computer system 140 also includes mechanical housing components, connectors, power supplies, and other components not illustrated in FIG. 3. In various embodiments, remote computer 140 is a processing module integrated in an appliance, such as a phone or a display. In some such integrated embodiments, remote computer 140 is configured to use resources, such as power supply and mechanical support components, provided by the appliance or the display.

According to various embodiments, bus 302 is one or more of: a PCI bus; a PCI-EXPRESS bus; a HYPERTRANSPORT bus; an AMBA bus; and any other connections, including wired, wireless, and optical connections, for coupling components of remote computer 140. In some embodiments, bus 302 includes communications elements, such as controllers, data buffers and/or registers, drivers, repeaters, receivers, in addition to address, control, and data connections to enable communications among components of remote computer 140. According to various embodiments, bus 302 is one or more of: a single bus; a plurality of independent busses, with some of the components of remote computer 140 coupled to more than one of the independent busses; a plurality of bridged busses; a fabric, such as HYPERTRANSPORT or any other one or more busses configured to couple the components of remote computer 140.

In some embodiments, network interface 305 provides communicative coupling between remote computer 140 and host computer 110 using network 130. Network interface 305 receives encoded text and image (i.e., non-text) information and stores it in memory 330 prior to decoding. At lower protocol levels, network interface 305 sends and receives electrical, electromagnetic, and/or optical signals that carry data, such as digital data streams, representing various types of information. In some embodiments, network interface 305 supports protocol stacks for network communications, such as TCP/IP and/or encryption protocols complementary to compatible protocols of host computer 110.

In various embodiments, controller 310 provides control and/or management functions for remote computer 140. In some such embodiments, controller 310 includes one or more of: a microcontroller, such as those manufactured by Motorola, Renesas or Microchip; a 32-bit CPU; a 64-bit CPU; an AMD CPU, such as an OPTERON or ATHLON CPU; an Intel CPU, such as a PERYN, PENIUM, ATOM or other x86 CPU; a SPARC microprocessor, such as those manufactured by Sun Microsystems Inc.; a POWERPC microprocessor, such as those manufactured by Motorola or IBM; and any other processor or computing device. In some embodiments where remote computer 140 includes an ASIC or an FPGA, controller 310 includes a processor embedded in the ASIC or the FPGA, such as a Microprocessor without Interlocked Pipeline Stages (MIPS), an Advanced Reduced Instruction Set Computing Machine (ARM), or another type of embedded processor.

According to various embodiments, controller 310 initializes one or more of: bus 302, network interface 305, progressive text mask decoder 150, non-text mask decoder 320, memory 330, display interface 340, and other components of remote computer 140. In some embodiments, controller 310 establishes a management connection with host computer 110 to enable communication of management information, such as mask information, image build state, status updates, and error reports. For example, in some embodiments, network interface 305 provides, at least in part, a first network connection (such as a TCP/IP socket) for receiving image data, and a second network connection for the management connection. In some embodiments, the image build state is sent along with the image data on the first network connection. In other embodiments, the image build state is sent, at least in part, on the management connection.

In various embodiments, progressive text mask decoder 150 comprises resources for reconstructing a text image based on encoded text mask information received from host computer 110. In some embodiments, progressive text mask decoder 150 retrieves encoded text information from memory 330 and executes decoding methods, for example as disclosed below in association with FIG. 4, including binary decoding and text reconstruction methods. In one or more embodiments, decoded text is written to an output frame buffer prior to display, for example an allocated region of memory 330 accessible by display interface 340. The progressive text mask decoder 150 may decode a rudimentary encoded text mask to generate rudimentary text images, followed by decoding refinement encodings of the text mask, such as addition of color (text pixel and/or text-background), pixel mask refinements, and/or text attribute detail (e.g., anti-aliasing, luminance profile, chrominance profile, and the like), thereby allowing an initial low latency, lower-quality (less accurate) display of the text image followed by refinements (increased accuracy) of the displayed text image until a specified level of quality is achieved.

In various embodiments, non-text mask decoder 320 performs decoding of encoded non-text image information, such as decoding of encoded image regions or mask regions not specified for progressive text decoding. In some embodiments, non-text mask decoder 320 performs operations such as binary decoding, inverse image transformation such as inverse wavelet or inverse DCT transformation, and/or video decoding. In further embodiments, non-text mask decoder 320 is implemented, at least in part, as a set of computer-executable instructions. According to various embodiments, non-text mask decoder 320 includes one or more of: a programmable embedded digital media processor, such as a TMS320DM64x DAVINCI digital media processor available from Texas Instruments; a PNX1300 NEXPERIA processor from NXP Semiconductors; a Field Programmable Gate Array (FPGA) or an Application Specific Integrated Circuit (ASIC) configured, at least in part, as a logic circuit to perform image decoding; and other processors and/or electronic hardware suitable for performing image decoding; software executing on and/or in conjunction with a processor, including any of the foregoing; and any combination of the foregoing.

In some embodiments, progressive text mask decoder 150 and/or non-text mask decoder 320 include binary decoding resources. According to various embodiments, the binary decoder performs one or more of: entropy arithmetic decoding; and a lossless data decompression technique. In further embodiments, the operation of the binary decoder is complementary to binary encoding performed by progressive text encoder 120 or non-text mask encoder 216. According to various embodiments, the binary decoder is implemented as one or more of: a logic circuit; software executed on a processor; and any combination of the foregoing. In some embodiments where binary decoding is implemented, at least in part, in software, at least some functions are executed as a set of instructions by controller 310 or a processor of remote computer 140. In some embodiments where a binary decoder is implemented, at least in part, as a logic circuit, the binary decoder resource is physically co-located with the text or non-text mask decoder, such as on the same integrated circuit.

In some embodiments where remote computer 140 includes a processor (such as a CPU, a microprocessor, a microcontroller, or a programmable media processor), resources of the processor may be used, at least in part, to implement one or more functions of components of remote computer 140, such as functions of network interface 305, progressive text mask decoder 150, non-text mask decoder 320, and display interface 340.

According to various embodiments, memory 330 includes one or more of: electronic, magnetic, optical, and/or other types of storage media; volatile computer-readable media, such as RAM, DRAM, and SRAM; and nonvolatile computer-readable media, such as ROM, hard drive, tape, CDROM, DVDROM, magneto-optical disks, EPROM, EEPROM, Flash EPROM.

In various embodiments, memory 330 stores information such as received image and mask information, decoded image information, decoded raster image information in a format accessible to display interface 340, and information associated with controller 310, such as machine readable code and/or data used by controller 310. In further embodiments, memory 330 includes a type of ROM or other non-volatile media used to store software, such as programs or firmware, executed by controller 310. In various embodiments, memory 330 is partitioned and/or distributed. For example, in some embodiments, memory 330 is partitioned into a plurality of partitions, such as separate system memory and frame buffer partitions, and the frame buffer partition is accessible by display interface 340. In various embodiments, memory 330 uses one or more independent busses for coupling with network interface 305, controller 310, decoders 150 and 320, display interface 340, and/or other components of remote computer 140. In further embodiments, memory 330 includes control logic for arbitrating access to memory 330 among the components of remote computer 140.

In various embodiments, display interface 340 accesses display information, such as decoded raster image information, from memory 330, and provides a display signal, such as a raster signal, for communication of display data to display 160. In various embodiments, display interface 340 includes a display controller (such as a video graphics array, or VGA, controller) and/or line driver circuitry such as Transition-Minimized Differential Signaling (TMDS) circuitry.

Support circuits 350 include at least one of power supplies, clock circuits, data registers, I/O interfaces, network interfaces, and the like. The support circuits 350 support the functionality of bus 302, network interface 305, progressive text mask decoder 150, non-text mask decoder 320, memory 330, display interface 340, and other components of remote computer 140.

In some embodiments, various combinations of all or portions of functions performed by a computer (such as host computer 110), a remote computer (such as remote computer 140), an image encoder (such as progressive text mask encoder 120), an image decoder (such as progressive text mask decoder 150), and portions of a processor, a microprocessor, or a programmable controller providing all or portions of the aforementioned functions, are specified by descriptions compatible with processing by a computer system (e.g. Verilog, Very-High-Speed Integrated Circuits Hardware Description Language VHDL, or any similar hardware description language). In various embodiments the processing includes any combination of interpretation, compilation, simulation, and synthesis to produce, to verify, or to specify logic and/or circuitry suitable for inclusion on an integrated circuit. The integrated circuit, according to various embodiments, is designed and/or manufactured according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

FIG. 4 is a flow diagram of a method 400 for transmitting progressively encoded text in accordance with one or more embodiments of the present invention. The method 400 starts ("Start" 402) and initializes ("Initialize" 410). In various embodiments, initialization comprises capturing an initial image from a pixel stream such as a DVI signal, reading an image or partial image from a frame buffer, and/or analyzing and masking regions of an image previously processed to prevent transfer of redundant information.

Next, a mask is generated ("Generate mask" 412) at a host computer, for example by applying one or more decomposition filters to the image. The decomposition filters decompose the image into one or more text layers. corresponding text-background layers, and one or more other layers (i.e., non-text layers), such as one or more picture layers, background-fill layers, and the like. Various image-type masks may then be determined, for example, a text mask may be determined from a text layer and related text-background layer information.

During decomposition, the text features of the image being processed are identified using one or more local contrast analysis filters, text recognition filters, or the like, as previously described. In some embodiments, one or more text types, such as block text, anti-aliased text, or CLEARTYPE® text, are identified as previously described. In some such embodiments, the one or more text types are indicated in the mask or a separate data structure in order for the remote computer to approximate the same text features (e.g. block, anti-aliasing, CLEARTYPE®, and the like). In some embodiments, text type is determined by text type information provided by application software, host operating system, or driver software. In various embodiments, the mask generated for encoding is an initial mask of a text mask of the image, such as a text pixel mask, i.e., a binary map that describes attributes and location of one or more text features identified in the image which are then indicated as one or more sets of pixels and text information in the mask. In some embodiments, a text-background color is also identified and associated with each set of pixels. Such text-background colors could be accurate color representations or color approximations in different embodiments. In other embodiments, pixels not belonging to the indicated one or more sets of pixels in the mask are presumed to be text-background pixels and assigned as such. In other embodiments, transmission of color information is not initially required when a default text and text-background color are used at the remote computer as a first step in the progression. In other embodiments, text color information (e.g. accurate, approximate, or average color information) is identified so that is can be transmitted initially, and the remote computer selects one or more default text-background colors in contrast to the identified text colors. In some embodiments comprising text with a plurality of colors, an average color such as average chrominance and luminance for a text region is computed and stored in a data structure for communication.

In some embodiments, the initial mask is encoded using a suitable lossless encoding method, such as Golomb binary encoding, to generate an initial encoding. In other embodiments, the mask is encoded using a lossy encoding method, such as a lossless encoding of a sub-sampled or filtered mask, to generate the initial encoding.

In some embodiments, the initial mask generated is a multi-layered mask, comprising one or more layers associated with text features and other layers associated with other image types, such as background-fill, picture, or video image types. In such an embodiment, each image type is encoded using suitable means (such as transform, quantization and binary encoding) to generate an initial encoding for transmission to the remote computer.

Next, the encoded mask (i.e., the initial encoding) is transmitted ("Transmit initial encoding" 414) to a remote computer, such as computer 140. In some embodiments where the image comprises text and text-background, the initial encoding comprises a description of text features, and no additional image information need be transmitted at this step. In other embodiments wherein the image comprises both text and other image types, other image information, such as one or more of picture masks, object masks, and the like, or a portion of a picture mask, object mask, and the like, may be encoded and transmitted.

As a next step, the encoded mask received by the remote computer is decoded ("Decode initial encoding" 416). In various embodiments, a binary decoding method, such as Golomb decoding, complementary to the encoding method employed at the host computer is executed. In some embodiments where no color information has been transmitted with the encoded mask, the remote computer selects a default color scheme, such as black or grey text on a white text-background. In other embodiments where the text-background color is transmitted in the encoded mask or by separate means, a contrasting text color is selected for display. In other embodiments where the text color is transmitted in the encoded mask or separately, a contrasting text-background color is selected for display. In other embodiments where an average color such as average chrominance and luminance for a region is indicated, the text is reproduced using the average color. In other embodiments, both text and text-background colors are transmitted and used to determine colors for display of text and text-background.

In various embodiments, the decoded text and text-background images are written to a frame buffer, for example a frame buffer of memory 330, in preparation for display. In some embodiments where the display image comprises other features such as pictures, video, and/or other non-text objects, these are decoded using methods complementary to their encoding format and written to the output frame buffer for display.

According to select embodiments, anti-aliasing of the text is approximated as a next step ("Approximate anti-aliasing" 418), while the method 400 skips step 418 and continues to step 420 in other embodiments. In some embodiments where a decoding of the initial encoding (i.e., an initial mask) provides an indication that the text is anti-aliased text, step 418 approximates the anti-aliased text. In some embodiments, anti-aliased text is approximated by applying horizontal and vertical smoothing filters which set selective masked pixels adjacent to text-background pixels to a color representative of anti-aliased shading. In further embodiments, pixels are normalized to average chrominance and luminance values provided by the host computer to minimize transitional blooming artifacts associated with progressive image display. In some embodiments, CLEARTYPE® text is approximated by applying smoothing filters to the different color planes to approximate the sub-pixel offsets associated with CLEARTYPE® text features.

Next, an initial image of at least one text region of the image is displayed ("Initial Image Display" 420). In various embodiments, a display interface comprising a display controller (such as display interface 340) retrieves the image comprising text, text-background and optionally other image elements from the frame buffer and communicates it to a display device, such as display 160.

The initial display depicts a lower quality (i.e., less accurate) version of the text region or regions of the image. In some embodiments, the initial display may additionally depict lower quality versions of one or more other image types (e.g., picture, object, and the like) transmitted.

Next, a refinement encoding is generated at the host computer and transmitted to the remote computer ("Generate and transmit refinement encoding" 422). The refinement encoding is generated by encoding a refinement mask of the text mask. In some embodiments, the refinement mask may be the same mask as the initial mask, and may be encoded utilizing an encoding that provides more information than the initial encoding. Alternatively, the refinement mask may be a different mask than the initial mask. Encoding methods analogous to the encoding methods utilized to generate the initial encoding may be utilized, such as lossy or lossless encoding methods. In some embodiments, a status (i.e., a text mask status) is maintained for identifying associated pixels of a text mask and a current build state.

According to various embodiments, the refinement encoding comprises at least one of an improved accuracy in color, an accurate color representation of one or more text features; anti-aliasing detail associated with one or more text features; color information associated with the text-background of one or more text features, or additional mask information such as an improved accuracy mask or a lossless mask representation.

The transmitted refinement mask is then received and decoded, and a refined image of the at least one text region is displayed ("Receive refinement encoding and generate refined display" 424). Similar decoding methods may be used such as those previously described.

The refined display depicts a higher quality (i.e., more accurate) version of the text region or regions of the image than the initial display. In some embodiments, the refined display may additionally depict higher quality versions of one or more other image types (e.g., picture, object, and the like) than the initial display.

A determination is then made as to whether an assembly of the decoded initial encoding and any decoded refinement encodings (i.e., the refined display) provides a specified (i.e., desired) level of quality ("Specified quality level achieved?" 426). If the result of such determination is no, the method 400 returns to step 422, where further refinement encodings are generated and transmitted for display. If the result of such determination is yes, the method 400 proceeds to step 428.

A determination is then made as to whether a new image should be transmitted ("New image?" 428). If the result of such determination is yes, for example if a pixel update status indicates at least one change in the text mask, the method 400 returns to step 412. If the result of such determination is no, for example if a pixel update status indicates no change in the text mask, or in the case that no more text updates are available for transmission or when a user session terminates, the method 400 proceeds to step 430 and ends.

Figures 5, 5G:
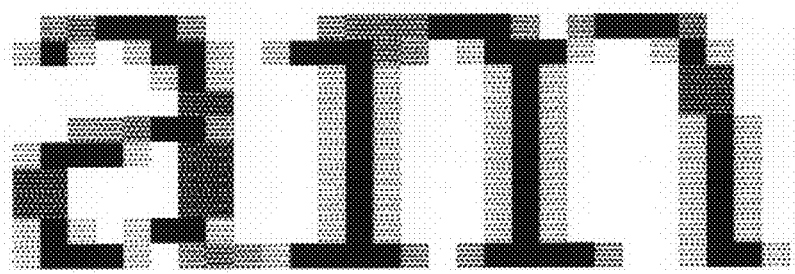
FIG. 5 is a series of pixilated text images and masks associated with progressive text transmission of an anti-aliased text image representation in accordance with one or more embodiments of the present invention.

FIG. 5 is a series 500 of pixilated text images and masks associated with progressive text transmission of an anti-aliased text image representation in accordance with one or more embodiments of the present invention. In one or more embodiments of progressive text encoding employed, a composite image representation that includes one or more picture regions and one or more text regions is decomposed, encoded, and transmitted to a remote system. The one or more text regions may comprise standard block text, anti-aliased text, boldface text, or text having one or more other text attributes.

The images depicted in FIG. 5 are related to an exemplary alphanumeric letter sequence comprising the letters 'am', for example as might be rendered to a raster format frame buffer or display apparatus using regular anti-aliasing; alternatively, a sub-pixel font rendering technology such as CLEARTYPE® from MICROSOFT corporation, FREETYPE® fonts, or similar rendering technology from APPLE, ADOBE, or comparable corporations, may be utilized to generate a similar alphanumeric letter sequence.

FIG. 5a depicts a text image representation 508 of an anti-aliased text image comprising fine bit patterns of pixels of different shades. In an exemplary grayscale embodiment, shaded pixel 501 represents a 100% white pixel, shaded pixel 502 represents a 10% grayscale pixel, shaded pixel 503 represents a 25% grayscale pixel, shaded pixel 504 represents a 40% grayscale pixel, shaded pixel 505 represents a 50% grayscale pixel, shaded pixel 506 represents an 80% grayscale pixel, and shaded pixel 507 represents a 100% black pixel. However, in other embodiments, the pixels of text image representation 508 may comprise various shaded colors or a mixture of grayscale and color pixels.

FIG. 5*b* depicts text pixel mask 510 ("mask 510") associated with text image representation 508, determined through image decomposition. In an embodiment, mask 510 comprises a two-dimensional bit-plane (i.e., each location represented by a single bit) in which the bit at each location is either set if it corresponds to a text pixel in text image representation 508 (visually depicted as shaded areas of mask 510) or cleared if it corresponds to a non-text pixel in text image representation 508 (visually depicted as non-shaded areas of mask 510). In some embodiments, text pixel mask 510 may be an initial mask of a text mask pertaining to text image representation 508 utilized to generate an initial encoding of the text mask. In such embodiments, the initial encoding may consist of an approximation of the text pixel mask 510, where the approximation comprises a scaling of the text pixel mask 510, a sub-sampling of the text pixel mask 510 (as described below in FIG. 5*f*), and/or a filtering of the text pixel mask 510 (as described below in FIG. 5*d*).

FIG. 5*c* depicts text pixel mask 520 ("mask 520"). Mask 520 comprises mask 510 in conjunction with additional color approximation information associated with the text layer derived from text image representation 508, typically determined through image decomposition. Mask 520 comprises an assigned initial color or grayscale value that may be transmitted as a text layer attribute in an initial encoding of the corresponding text mask so that the initial encoding can be used to generate an initial text image display approximation. The initial color or grayscale value of the text layer is determined through analysis of text image representation 508 (e.g., average color determination, a calculation based on chrominance and luminance values for a plurality of text pixel colors of pixels associated with the text layer, or a similar method) or derived from graphics information used to generate text image representation 508. In some embodiments, text pixel mask 520 may be an initial mask of a text mask pertaining to text image representation 508 utilized to generate an initial encoding of the text mask. In such embodiments, the initial encoding may consist of an approximation of the text pixel mask 520, where the approximation comprises a scaling of the text pixel mask 520, a sub-sampling of the text pixel mask 520, and/or a filtering of the text pixel mask 520 (as described below in FIG. 5*e*).

FIG. 5*d* depicts filtered text pixel mask 530 ("mask 530"). Mask 530 is a lossy approximation of text pixel mask 510 ('lossy' due to the loss of spatial detail related to the text image representation 508). In an embodiment, mask 530 is obtained by applying a filter technique such as image dilation and/or erosion to text pixel mask 510 with an objective of achieving a superior compression ratio during downstream lossless encoding of the mask.

FIG. 5*e* depicts filtered text pixel mask 540 ("mask 540"). Mask 540 comprises mask 530 and additional color approximation information. Mask 540 is assigned an initial color or grayscale value (typically transmitted as a text layer attribute or a text color for a text region) so that an initial encoding of the corresponding text mask can be used to generate an initial text image display approximation.

FIG. 5*f* depicts sub-sampled text pixel mask 550 ("mask 550") which is an alternative form of a lossy approximation of mask 510, derived using image sub-sampling methods rather than image filtering methods as applied in the derivation of filtered text pixel mask 530.

FIG. 5*g* depicts image representation 560 ("image 560"). Image 560 is an approximation of anti-aliased text image representation 508 comprising pixels of different shades. Image 560 is derived at a decoder at the remote system (e.g., the progressive text mask decoder 150 in FIG. 1) from the text pixel mask 510 received from the host computer, in conjunction with luminance profile information. In various embodiments, such luminance profile information is determined by a generic anti-aliased luminance profile (stored at the decoder), generic anti-aliased luminance information received from the host computer, or luminance information received from the host computer tuned to the luminance of a specific text region. In an embodiment, luminance approximations are determined for 1×2, 1×3, 1×4, 2×2, and 2×3 regions of the original text image 508, following which similarly dimensioned areas of mask 510 are filled in with comparable luminance values to generate an initial image approximation of image 560. Statistically infrequent pixel block sizes such as long 1×n pixel areas are individually coded or decoded to an average luminance.

Figures 6, 6A:
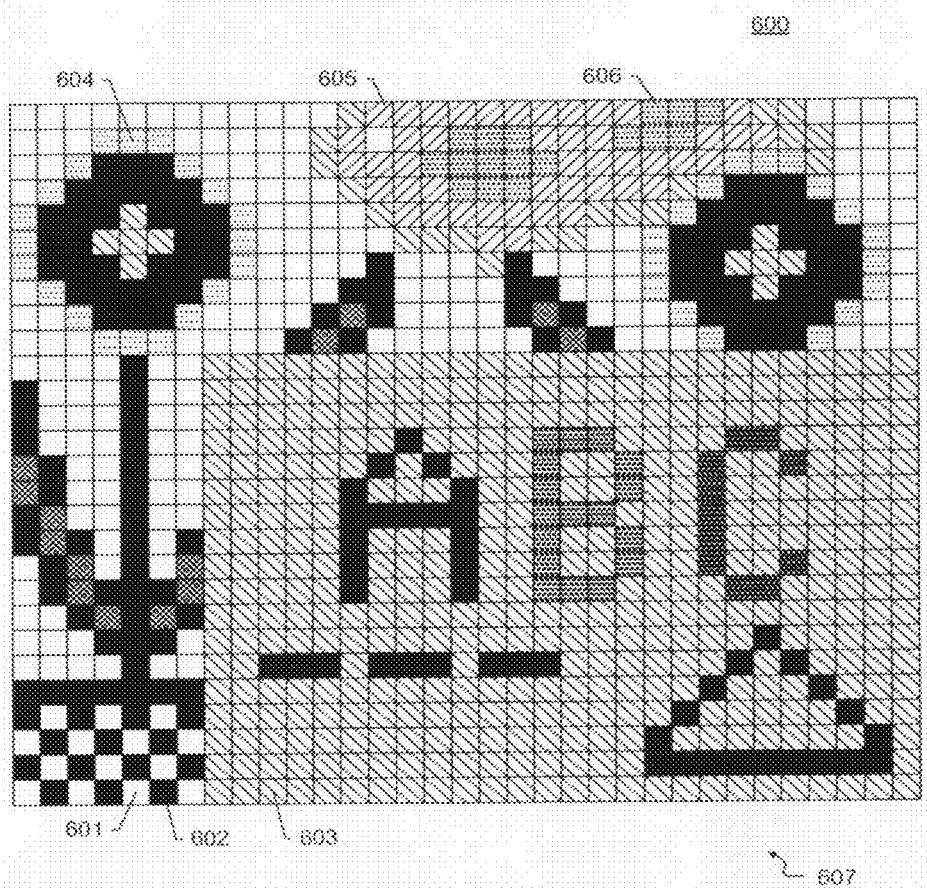
FIG. 6 is a series of images related to a composite image representation in accordance with one or more embodiments of the present invention.

FIG. 6 is a series of images 600 related to a composite image representation 607 in accordance with one or more embodiments of the present invention. Non-text region 610 and text region 620 are related to the decomposition and text transmission process; text region 620 comprises text layer 630 with text pixel mask 640 in addition to text-background layers 650 and 660 with text-background pixel mask 670.

FIG. 6*a* depicts composite image representation 607 comprising a region of multi-color text on a solid rectangular text-background which is overlaid on a non-text image region, the non-text image region comprising a multi-color picture image in the shown embodiment. Pixels 601, 602, 603, 604, 605, and 606 are depicted by different shadings (i.e., different concentrations of cross-hatching) to represent different pixel colors. It should be noted that the decomposition and progressive transmission methods disclosed by the present invention are not limited to any specific color palette, and pixels 601, 602, 603, 604, 605, and 606 may be grayscales or different colors in different embodiments.

Figures 6, 6B:
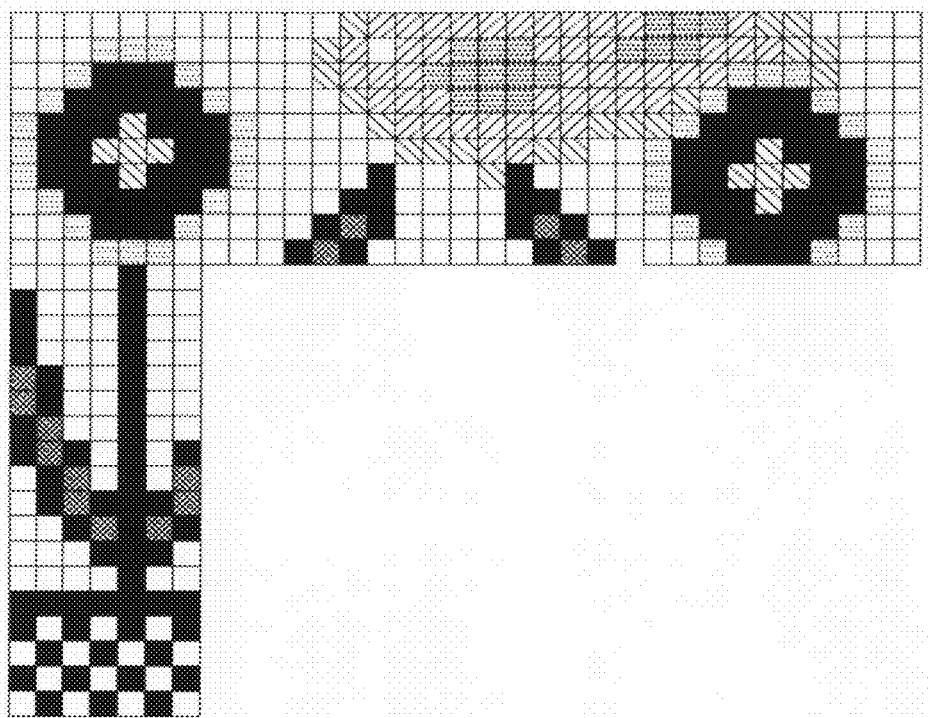

FIG. 6*b* depicts non-text region 610 of composite image representation 607. Generally, a non-text region comprises a location in an image defined by one or more non-text image entities which may be assigned to one or more non-text layers, thereby enabling the use of different encoding techniques for different non-text image types. In an embodiment, picture type image areas, background-fill areas, and 'object' areas, such as areas comprising icons, other high-contrast non-text features, patterns, gradient-fills, and the like are assigned to non-text layers associated with non-text region 610. Non text-region 610 is defined by a non-text mask describing location and content of composite image representation 607 marked for encoding by non-text mask encoder 216 of FIG. 2.

FIG. 6*c* depicts text region 620 of composite image representation 607. A text region is generally defined as a location in an image comprising high contrast objects such as text pixels (generally identifiable through a process of decomposition) on a solid background (i.e., a text-background) such as a background comprising a single color. In instances where text pixels are overlaid directly on a high contrast background such as a picture image, gradient-fill or pattern-fill, alternative encoding methods described elsewhere are generally more applicable. The exemplary text region 620 of image representation 607 comprises text pixels of different colors on a single text-background color. The text mask as defined by the present invention describes one or more text regions typically through provision of one or more text masks that locate the text regions within the image. The text mask comprises a text layer (ref. text layer 630 described below) and a related text-background layer (ref. text-background layer 650 or text-background layer 660 described below) for each represented text region, collectively marked for encoding by progressive text mask encoder 120 of FIG. 1. Note that the image representation 607 comprises a single text region and a single non-text region for purposes of clarity. However, the text transmission methods described by the present invention are generally applicable to images comprising multiple text regions and multiple non-text regions.

FIG. 6*d* depicts a text layer 630 associated with text region 620. A text layer generally comprises text color information, text attributes such as text type information (including such text types as CLEARTYPE® text, TRUETYPE® text, FREETYPE® text, block text, bold text and anti-aliasing details) and a text pixel mask (ref. text pixel mask 640 described below).

FIG. 6*e* depicts the text pixel mask 640 associated with text layer 630. The text pixel mask 640 is generally a spatially-defined pixel mask comprising a binary digit (i.e., a 'bit') representing each pixel location in the underlying image. The bit is set if the underlying image pixel is text (i.e., depicted as shaded bit representations of text pixel mask 640) or cleared if the underlying image pixel is text-background. Much of the information of a text image can be derived from such a text pixel mask 640 as depicted in image representation 700 of FIG. 7 described below. For example, as long as the text pixels are in color contrast with the text-background pixels, text is legible to human perception in spite of lossy, inaccurate, or otherwise erroneous pixel color representation. Furthermore, the text pixel mask 640 itself can be encoded as a lossy image representation to further reduce the latency or communication bandwidth associated with image transmission. Thereafter, corrections to errors in the text pixel mask 640 can be communicated as a progressive build of the mask.

FIG. 6*f* depicts text-background layer 650 associated with text region 620, excluding pixels defined by text pixel mask 640. The text-background layer 650 provides the color information and text-background pixel mask for the text-background pixels around the text pixels of text region 620 (i.e., the text-background). FIG. 6*g* depicts text-background layer 660 comprising background pixels (i.e., text-background) both around and under the pixels defined by text pixel mask 640.

FIG. 6*h* depicts text-background pixel mask 670 associated with text-background layer 650. The text-background pixel mask 670 is generally a spatially-defined pixel mask comprising a binary digit (i.e., a 'bit') representing each pixel location in the underlying image. The bit is set if the underlying image pixel is text-background (i.e., depicted as shaded bit representations of text-background pixel mask 670) or cleared if the underlying image pixel is text. For efficiency purposes, progressive text mask encoder 120 (of FIG. 1) typically encodes the text-background mask as a solid fill background region (i.e. text-background layer 660) rather than encoding the text-background layer 650 with text outline information which is typically also embodied in the text pixel mask (mask 640).

Figure 7:
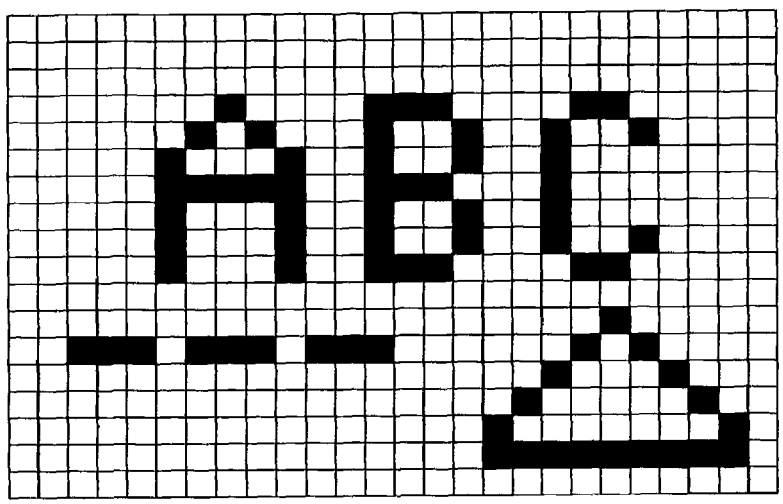
FIG. 7 is an image representation in accordance with one or more embodiments of the present invention.

FIG. 7 is an image representation 700 in accordance with one or more embodiments of the present invention. Image representation 700 is a reduced quality text image in which color information is not represented as part of an initial encoding. Image representation 700 comprises a visual depiction of a text pixel mask itself (ref. mask 640 of FIG. 6*e*) on a colorless text-background. In various alternative embodiments, an initial encoding comprises a lossy image mask such as a filter mask (ref. mask 530 of FIG. 5) or sub-sampled mask (ref. mask 550 of FIG. 5).

While the foregoing is directed to embodiments of the present invention, other and further embodiments of the invention may be devised without departing from the basic scope thereof, and the scope thereof is determined by the claims that follow.

The invention claimed is:

1. Apparatus for transmitting image information for display within a remote computing environment, comprising:
 a decomposition filter for determining a text mask from an image, the text mask determined from a text layer and related text-background information extracted from the image and comprising an initial mask and at least one refinement mask;
 a text mask encoder for encoding the initial mask to generate an initial encoding and encoding a refinement mask of the at least one refinement mask to generate at least one refinement encoding, wherein the text mask comprises:
  a text pixel mask, a plurality of text pixel colors of pixels associated with the text layer, and a text-background pixel color, wherein:
   the initial encoding comprises (i) an approximation of the text pixel mask comprising a filtering of the text pixel mask, and (ii) an encoded text pixel color determined from at least a portion of the plurality of the text pixel colors;
   the at least one refinement encoding comprises (i) mask refinement information for enhancing a decoding of the initial encoding to generate a lossless version of the text pixel mask, and (ii) color refinement information for enhancing the decoding of the initial encoding to generate a plurality of display text pixel colors closer in accuracy to the plurality of text pixel colors than a decoding of the encoded text pixel color; and
   at least one of the initial encoding or the at least one refinement encoding comprises an encoding of the text-background pixel color; and
 a network interface for transmitting at least one encoding, the at least one encoding comprising the at least one refinement encoding.

2. The apparatus of claim 1 further comprising a change detector for determining a pixel update status, wherein the text mask is determined and the text mask encoder encodes the initial mask to generate the initial encoding when the pixel update status indicates at least one change in a pixel associated with the text mask, and wherein the encoding the refinement mask of the at least one refinement mask is performed when the pixel update status indicates a consistency of the text mask.

3. The apparatus of claim 2, wherein the text mask encoder encodes an additional at least one refinement mask to generate at least one additional refinement encoding for providing a quality improvement progression of refinement encodings, wherein an assembly of the initial encoding, the at least one refinement encoding, and the at least one additional refinement encoding comprises content to provide a specified quality of a visual depiction of a text region of the image.

4. The apparatus of claim 3, wherein the text mask encoder maintains a status of each encoding of the text mask.

5. The apparatus of claim 1, wherein the decomposition filter determines a picture mask from the image, and further comprising a non-text mask encoder for encoding the picture mask to generate an encoded picture mask, wherein the network interface transmits the encoded picture mask.

6. The apparatus of claim 5, wherein the text mask encoder is enabled to efficiently encode fine bit patterns of text pixel masks, and wherein the non-text mask encoder is enabled to efficiently encode picture pixel masks comprising blocks of picture pixels.

7. The apparatus of claim 5, wherein the non-text mask encoder is enabled to efficiently encode color values and color value variations of blocks of natural images, and wherein the text mask encoder is enabled to efficiently encode pixel color values and pixel color value variations of computer generated text.

8. The apparatus of claim 2 wherein at least one of the encoding or the transmitting is prioritized based on the pixel update status.

9. The apparatus of claim 8 wherein the transmitting is further prioritized based on an available bandwidth, the available bandwidth comprising an available communication bandwidth of the network interface.

10. The apparatus of claim 1, wherein the decomposition filter comprises at least one of an image contrast analyzer, a color counter, a text recognition analyzer, a background recognition analyzer, or a drawing commands analyzer.

11. Apparatus for receiving transmitted image information for display within a remote computing environment, comprising:
    a network interface for receiving an initial encoding and at least one refinement encoding of a text mask of an image, wherein the text mask comprises:
    a text pixel mask, a plurality of text pixel colors of pixels associated with a text layer, and a text-background pixel color, wherein:
        the initial encoding comprises (i) an encoded approximation of the text pixel mask comprising a filtering of the text pixel mask, and (ii) an encoded text pixel color determined from at least a portion of the plurality of the text pixel colors;
        the at least one refinement encoding comprises (i) encoded mask refinement information for enhancing a decoding of the initial encoding to generate a lossless version of the text pixel mask, and (ii) encoded color refinement information for enhancing the decoding of the initial encoding to generate a plurality of display text pixel colors closer in accuracy to the plurality of text pixel colors than a decoding of the encoded text pixel color; and
        at least one of the initial encoding or the at least one refinement encoding comprises an encoding of the text-background pixel color; and
    a decoder for decoding the initial encoding and the at least one refinement encoding to generate respectively an initial display of at least one text region of the image and at least one refined display of the at least one text region subsequent to the initial display.

12. The apparatus of claim 11, wherein the initial display visually depicts an approximation of the at least one text region and the at least one refined display provides a more accurate visual depiction of the at least one text region than the initial display.

13. The apparatus of claim 12, wherein the initial encoding comprises an encoding of the text pixel mask, a text color, text attribute information, and the text-background pixel color, wherein the approximation comprises a text-background of the text-background pixel color with at least one text layer in front of the text-background, the at least one text layer comprising the text pixel mask and a plurality of text pixel colors determined from the text color and the text attribute information.

14. A method for communicating image information for display within a remote computing environment, comprising:
    (i) determining, by a host computer having one or more processors, a text mask from an image, the text mask determined from a text layer and related text-background information extracted from the image and comprising an initial mask and at least one refinement mask;
    (ii) encoding, by the host computer having the one or more processors, the initial mask to generate an initial encoding;
    (iii) transmitting, via a network interface of the host computer, the initial encoding;
    (iv) encoding, by the host computer having the one or more processors, a refinement mask of the at least one refinement mask to generate a refinement encoding; and
    (v) transmitting, via the network interface, the refinement encoding, the refinement encoding transmitted subsequent to the transmitting the initial encoding, wherein the text mask comprises:
        a text pixel mask, a plurality of text pixel colors of pixels associated with the text layer, and a text-background pixel color, wherein:
        the initial encoding comprises (a) an approximation of the text pixel mask comprising a filtering of the text pixel mask, and (b) an encoded text pixel color determined from at least a portion of the plurality of the text pixel colors;
        the refinement encoding comprising (c) mask refinement information for enhancing a decoding of the initial encoding to generate a lossless version of the text pixel mask, and (d) color refinement information for enhancing the decoding of the initial encoding to generate a plurality of display text pixel colors closer in accuracy to the plurality of text pixel colors than a decoding of the encoded text pixel color; and
    at least one of the initial encoding or the refinement encoding comprises an encoding of the text-background pixel color.

15. The method of claim 14 further comprising determining a pixel update status, wherein the determining a text mask and the encoding the initial mask are performed when the pixel update status indicates at least one change to at least one pixel associated with the text mask.

16. The method of claim 14 further comprising:
    determining a pixel update status; and
    re-determining the text mask when the pixel update status indicates a consistency of pixels of the text mask, wherein the re-determining is performed prior to the encoding a refinement mask.

17. The method of claim 15, wherein steps (iv) and (v) are repeated when the pixel update status indicates a consistency of pixels associated with the text mask until an assembly of the initial encoding and the refinement encoding comprises content to provide a specified quality of a visual depiction of a text region of the image.

18. The method of claim 14 wherein the text mask comprises at least one text region comprising (i) the plurality of text pixel colors and the text pixel mask determined from the text layer, and (ii) a text-background color and a text-background pixel mask determined from a text-background layer.

19. The method of claim 18, wherein the determining the text mask comprises decomposing the image, the decomposing comprising applying a plurality of filters to the image to identify the text-background layer, the text layer, and a picture layer.

20. The method of claim 19, further comprising:
determining a picture mask from the picture layer of the image, the picture mask comprising at least one of a first low contrast image portion or a second low contrast image portion comprising at least one high contrast image portion within the second low contrast image portion;
encoding at least a portion of the picture mask to generate an encoded picture mask; and
transmitting the encoded picture mask.

21. The method of claim 15, wherein at least one of the encoding or the transmitting is prioritized based on the pixel update status.

22. The method of claim 21 wherein the at least one of the encoding or the transmitting is further prioritized based on an available bandwidth, the available bandwidth comprising an available communication bandwidth for the communicating image information.

23. The method of claim 14, wherein the initial encoding comprises an encoded text approximation for providing an initial display of at least one text region of the image and the refinement encoding comprises encoded enhancement information for providing a refined display of the at least one text region, the refined display providing a more accurate visual depiction of the at least one text region than the initial display.

24. The method of claim 23, wherein the enhancement information comprises at least one of improved color accuracy, accurate color representation, anti-aliasing detail, text-background color information, an improved accuracy text pixel mask, or a lossless text pixel mask representation.

25. The method of claim 14, further comprising:
identifying at least one text attribute associated with the text layer, the at least one text attribute comprising at least one of a luminance profile, a chrominance profile, bold text, aliased text, anti-aliased text, or sub-pixel anti-aliased text;
generating attribute information based on the at least one text attribute; and
associating the attribute information with the text layer.

26. The method of claim 25, wherein the initial encoding comprises at least a portion of the attribute information.

27. The method of claim 14, further comprising:
receiving the initial encoding;
decoding the initial encoding to generate an initial display of at least one text region of the image;
receiving the refinement encoding; and
decoding the refinement encoding to generate a refined display of the at least one text region subsequent to the initial display.

28. The method of claim 27, wherein the initial display visually depicts an approximation of the at least one text region and wherein the refined display provides a more accurate visual depiction of the at least one text region than the initial display.

29. A method for displaying an approximation of an image at a remote computer, comprising:
receiving, at the remote computer having one or more processors, an initial encoding of a text mask of a text region determined from the image, the initial encoding comprising a filtering of a text pixel mask, a text-background color, an encoded text pixel color determined from at least a portion of a plurality of text pixel colors of the image, and at least one text attribute;
decoding, by the remote computer having one or more processors, the initial encoding to generate an initial visual display, the initial visual display comprising a plurality of text pixels among a plurality of text-background pixels, wherein a text display color of each of the plurality of text pixels is determined from (i) an associated position of each of the plurality of text pixels in the text pixel mask, (ii) the encoded text pixel color and (iii) the at least one text attribute;
receiving, at the remote computer having one or more processors and subsequent to the decoding of the initial encoding, a refinement encoding of the text mask comprising mask refinement information for enhancing the decoding of the initial encoding to generate a lossless version of the text pixel mask and text pixel color information for enhancing the decoding of the initial encoding to generate a plurality of display text pixel colors closer in accuracy to pixel colors of the image than a decoding of the initial encoding; and
decoding, by the remote computer having one or more processors, the refinement encoding to modify the text display color of at least one of the plurality of text pixels to generate a refined visual display, wherein the refined visual display provides a higher quality visual depiction of the text region than the initial visual display, wherein a text-background display color of the plurality of text-background pixels is determined from the text-background color.

30. A system for communicating image information for display within a remote computing environment, comprising:
a host computer for (i) determining a text mask of a text region from an image, the text mask determined from a text layer and related text-background information extracted from the image and comprising an initial mask and at least one refinement mask, (ii) encoding the initial mask to produce an initial encoding, (iii) transmitting the initial encoding, (iv) encoding a refinement mask of the at least one refinement mask to produce a refinement encoding, and (v) subsequent to the transmitting the initial encoding, transmitting the refinement encoding; and
a remote computer for (vi) receiving the initial encoding, (vii) decoding the initial encoding to generate an initial display of the text region of the image, (viii) receiving the refinement encoding, and (ix) decoding the refinement encoding to generate a refined display of the text region of the image, the refined display providing a more accurate visual depiction of the text region than the initial display; wherein the text mask comprises:
a text pixel mask, a plurality of text pixel colors of pixels associated with the text layer, and a text-background pixel color, wherein:
the initial encoding comprises (a) an approximation of the text pixel mask comprising a filtering of the text pixel mask, and (b) an encoded text pixel color determined from at least a portion of the plurality of the text pixel colors;
the refinement encoding comprises (c) mask refinement information for enhancing a decoding of the initial encoding to generate a lossless version of the text pixel mask, and (d) color refinement information for enhancing the decoding of the initial encoding to generate a plurality of display text pixel colors closer in accuracy to the plurality of text pixel colors than a decoding of the encoded text pixel color; and
at least one of the initial encoding or the refinement encoding comprises an encoding of the text-background pixel color.

31. The system of claim 30 wherein the host computer further determines a pixel update status and repeats steps (iv) and (v) and the remote computer further repeats steps (viii) and (ix) when the pixel update status indicates a consistency of pixels associated with the text mask until the refined display provides a desired quality visual depiction of the text region.

32. The system of claim 30 wherein the host computer further (x) determines a picture mask of a picture region of the image, the picture mask associated with a picture layer, (xi) encodes at least a portion of the picture mask to generate an encoded picture mask, and (xii) transmits the encoded picture mask, and the remote computer further (xiii) receives the encoded picture mask, and (xiv) decodes the encoded picture mask for display in conjunction with at least one of the initial display or the refined display.

33. The system of claim 31 wherein the pixel update status of the host computer determines a change status of a second region of the image and wherein at least one of the encoding the initial mask or the encoding a refinement mask is prioritized based on the change status of the second region.

34. The system of claim 30, wherein the determining a text mask utilizes at least one of image contrast analysis, color count analysis, text recognition analysis, or analysis of drawing commands.

35. The system of claim 30, wherein the refinement encoding comprises at least one of improved color accuracy, accurate color representation, anti-aliasing detail, text-background color information, an improved accuracy text pixel mask, or a lossless text pixel mask representation.

36. The system of claim 30, wherein the host computer further (i) identifies at least one text attribute associated with the text layer, the at least one text attribute comprising at least one of a luminance profile, a chrominance profile, bold text, aliased text, anti-aliased text, or sub-pixel anti-aliased text, (ii) generates attribute information based on the at least one text attribute, and (iii) associates the attribute information with the text layer.

37. The system of claim 36, wherein the initial encoding comprises at least a portion of the attribute information.

* * * * *